(12) United States Patent
Crorey (10) Patent No.: US 7,926,195 B2
(45) Date of Patent: Apr. 19, 2011

(54) FLEXIBLE LOCATING DEVICE

(76) Inventor: David J. Crorey, Clinton Township, MI (US)

(*) Notice: Subject to any disclaimer, the term of this patent is extended or adjusted under 35 U.S.C. 154(b) by 0 days.

(21) Appl. No.: 12/535,106

(22) Filed: Aug. 4, 2009

(65) Prior Publication Data

US 2010/0126031 A1   May 27, 2010

Related U.S. Application Data (60) Provisional application No. 61/117,317, filed on Nov. 24, 2008.

(51) Int. Cl.
*G01B 3/14* (2006.01)
*G01B 5/00* (2006.01)
*G01B 7/00* (2006.01)
*B25H 7/00* (2006.01)

(52) U.S. Cl. .................................... 33/528; 33/DIG. 10

(58) Field of Classification Search .................... 33/528, 33/DIG. 10
See application file for complete search history.

(56) References Cited

U.S. PATENT DOCUMENTS

| | | | |
|---|---|---|---|
| 1,719,812 A | 7/1929 | Shaw et al. | |
| 1,971,189 A | 8/1934 | Leibing | |
| 2,992,490 A * | 7/1961 | Hay et al. | 33/528 |
| 3,279,080 A * | 10/1966 | Stepshinski | 33/354 |
| 3,722,360 A | 3/1973 | Blakey et al. | |
| 3,723,928 A | 3/1973 | Blakey et al. | |
| 4,372,050 A * | 2/1983 | Eisenhauer | 33/528 |
| 4,384,396 A | 5/1983 | Smolik | |
| 4,388,890 A | 6/1983 | Wester et al. | |
| 4,802,284 A * | 2/1989 | Jackson | 33/528 |
| 4,901,447 A | 2/1990 | Gottschalk | |
| 5,117,720 A | 6/1992 | Bussi | |
| 5,172,483 A | 12/1992 | Yocono, Sr. et al. | |
| 5,203,818 A | 4/1993 | Kuiper | |
| 5,348,274 A | 9/1994 | Breen | |
| 5,434,500 A | 7/1995 | Hauck et al. | |
| 5,615,490 A | 4/1997 | Burchell | |
| 5,711,082 A | 1/1998 | Olivo | |
| 5,813,130 A * | 9/1998 | MacDowell | 33/528 |
| 6,201,396 B1 | 3/2001 | Matsuo et al. | |
| 6,403,883 B1 | 6/2002 | Morgan et al. | |
| 6,452,097 B1 | 9/2002 | DeWall | |
| 6,708,421 B1 * | 3/2004 | Crorey | 33/613 |
| 7,434,327 B2 * | 10/2008 | Crorey | 33/528 |
| 7,661,201 B1 * | 2/2010 | Hordis | 33/528 |
| 2005/0011079 A1 * | 1/2005 | Sikora et al. | 33/566 |
| 2010/0095543 A1 * | 4/2010 | Inthavong | 33/528 |

FOREIGN PATENT DOCUMENTS

| | | |
|---|---|---|
| JP | 5-331957 | 12/1993 |
| JP | 6-257251 | 9/1994 |
| KR | 20-0388553 | 6/2005 |

* cited by examiner

*Primary Examiner* — Christopher W Fulton
(74) *Attorney, Agent, or Firm* — Young Basile (57) ABSTRACT

Disclosed are embodiments of a flexible locating apparatus capable of locating a perimeter of a body with respect to an outer surface of a sheet of material, the body being one of a multitude of body shapes. One embodiment of the apparatus comprises a target member having a main portion and an adjustable component, the adjustable component having a length and at least one securing member. The adjustable component is configured to adjust the length to the body to secure the target member internal with respect to the body with the at least one securing member. A defining member is positionable on an outer surface of the sheet and comprises opposing magnets from the magnets of the first member and a perimeter defining member comprised of more than one template, each template configured to define the perimeter of a different one of the multitude of body shapes.

18 Claims, 7 Drawing Sheets

FLEXIBLE LOCATING DEVICE

CROSS REFERENCE TO RELATED APPLICATIONS

This application claims priority from U.S. Provisional Application Ser. No. 61/117,317, filed on Nov. 24, 2008, which is incorporated herein in its entirety by reference.

FIELD OF THE INVENTION

The invention relates to an apparatus and method for locating various sized devices behind a wall or ceiling.

BACKGROUND OF THE INVENTION

During the construction of buildings and structures, object or bodies are fixedly associated or rigidly mounted with respect to structural frame members such as wood or metal studs. After the bodies are mounted to the structural frame members, sheet material such as dry wall, paneling or plywood is placed over the structural members, concealing the bodies mounted to the structural members. Before the building or structure is complete, the sheet material must be cut or pierced to expose the bodies. The bodies come in a variety of shapes and sizes. Generally, the bodies are used for communicating electricity to or as light fixtures predetermined locations in the building.

SUMMARY OF THE INVENTION

Disclosed herein are apparatus capable of locating a perimeter of a body with respect to an outer surface of a sheet of material, wherein the body is rigidly positioned behind the sheet of material, and wherein the body can be one of a multitude of body shapes. One embodiment of the apparatus comprises a target member having a main portion and an adjustable component, wherein the main portion supports the adjustable component and at least one magnet, the adjustable component having a length and at least one securing member, wherein the adjustable component is configured to adjust the length to a diameter of the body to secure the target member internal with respect to the body with the at least one securing member. A defining member is positionable on an outer surface of the sheet of material opposite the body. The defining member comprises at least one opposing magnet with an opposite polarity of the at least one magnet of the first member and a perimeter defining member comprised of more than one template, each template configured to define the perimeter of a different one of the multitude of body shapes.

Also disclosed herein is a perimeter defining device for use with a first magnetic member, wherein the first magnetic member has means for maintaining itself in a body rigidly positioned behind a sheet of material, and wherein the body can be one of a multitude of body shapes. The perimeter defining device comprises at least one opposing magnet with an opposite polarity of the magnet of the first magnetic member and a perimeter defining member comprised of more than one template, each template configured to define a perimeter of one of the multitude of body shapes.

Also disclosed herein is a method of defining the perimeter of a body rigidly positioned behind a sheet of material, wherein the body can be one of a multitude of body shapes. The method comprises securing a target member in the body, wherein the target member comprises a main portion with a top surface and a bottom surface, an adjustable component extending from at least one of the top surface and the bottom surface of the main portion and having a securing member and at least one magnet attached to the main portion. The sheet of material is positioned over the body and target member. A defining member is positioned on an outer surface of the sheet of material opposite the body, the defining member comprising at least one opposing magnet with an opposite polarity of the at least one magnet of the target member and a perimeter defining member comprised of more than one template, each template configured to define a perimeter of one of the multitude of body shapes. The perimeter of the body is defined on the sheet of material with the cooperating template.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
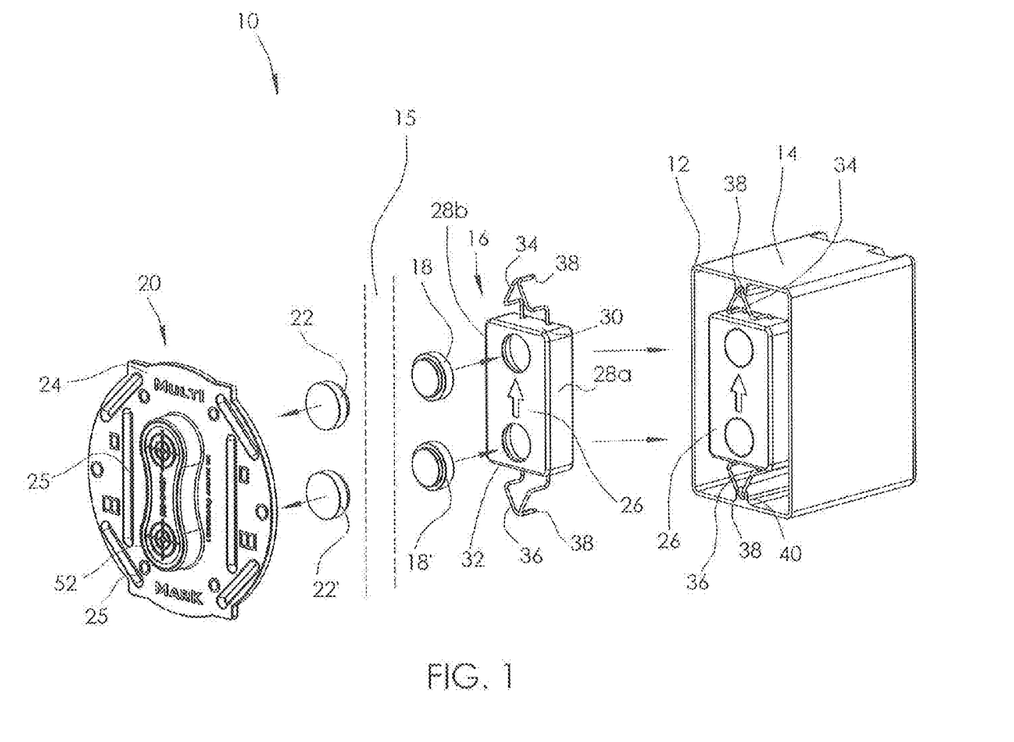
FIG. 1 is an exploded isometric view of a first embodiment of the flexible locating device disclosed herein.

Disclosed herein are embodiments of a flexible locating device that is capable of locating a variety of different body shapes behind a sheet of material with only one device. FIG. 1 illustrates an embodiment of a flexible locating device 10 configured to define at least a portion of a perimeter 12 of a body 14 with respect to an outer surface of a sheet 15 of material when the body 14 is rigidly positioned behind the sheet 15 of material. The flexible locating device 10 includes a first target member 16 positionable internal with respect to the body 14 and adjustable to the diameter of the body 14, and having at least one magnet 18. The first or target member 16 is shown in FIG. 1 as both an exploded view and positioned internal the body 14 for illustrative purposes. The flexible locating device 10 also includes a second defining member 20 positionable on an outer surface of a sheet 15 of material opposite the body 14. The second or defining member 20 includes at least one magnet 22 and includes a perimeter defining member 24 for defining various shaped and sized perimeters depending on the body used with respect to the outer surface of the sheet 15 of material, including the perimeter 12 of the body 14 in FIG. 1. The magnet 18 of the first member 16 cooperates with the magnet 22 of the second member 20 to substantially align the perimeter defining member 24 with the perimeter 12 of the body 14.

The at least one magnets 18, 22 of the first and second members 16, 20 can include as many magnets as desired or required to attain the necessary alignment of the first and second members 16, 20 with respect to one another when separated by the sheet 15 of material. For example, the at least one magnet 18 of the first member 16 can include first and second magnets 18, 18' and the at least one magnet 22 of the second member 20 can include third and fourth magnets 22, 22'. The magnets 18 and 18' can be mountable with respect to the first member 16 spaced apart relative to one another a first, or predetermined distance. The first distance can be selected based on the configuration of the first member. For example, a larger first member can include two magnets spaced apart a greater distance than two magnets associated with a smaller first member. The magnets 22 and 22' can be mountable with respect to the second member 20 spaced apart relative to one another the first distance.

It has been found that increasing the number of magnets mounted with respect to the first member 16 and the second member 20 can enhance the alignment of the perimeter defining member 24 with the body 14. The magnets mounted with respect to the first member 16 and the second member 20 can be oriented such that magnet 18 exposes a magnetic field toward the sheet 15 of material having a positive polarity or a "north" pole and the magnet 18' can expose a magnetic field toward the sheet 15 of material having a negative polarity or a "south" pole. Similarly, the magnet 22 can expose toward the sheet 15 of material a negative polarity and the magnet 22' can expose toward the sheet 15 of material a positive polarity. Such an embodiment of the invention can be advantageous if the body 14 is asymmetrical about a particular axis.

The first or target member 16 includes a main portion 26 shaped and sized to fit into a plurality of body shapes, described in more detail below. As shown in FIG. 1, the main portion 26 is a rectangular shape. The rectangular shape is provided by means of example and not meant to be limiting. Any suitable shape can be used. The main portion 26 can be a single molded piece, or can be formed from more than one piece. The materials of construction can be, as non-limiting examples, plastic, wood, or resin. The depth of the main portion 26 can be any depth sufficient enough to support the at least one magnet and shallow enough so as not to hinder the placement of the body 14 behind the sheet 15 of material.

The main portion 26 of the first member 16 has two opposing sides 28a, 28b, a top surface 30 and a bottom surface 32. The first member 16 includes at least one adjustable component, for example a spring with an end extending from the top surface 30 or the bottom surface 32 of the first member 16. The embodiment shown in FIG. 1 is a spring having two adjustable components, one on each end, shown as two hooks or loops 34, 36, one extending from the top surface 30 and one extending from the bottom surface 32, respectively.

As shown in FIG. 1, the hooks 34, 36 are integral with and extending from a longitudinal periphery of each of the top and bottom surfaces 30, 32. The loops 34, 36 are shown each ending with two portions meeting in the middle distal from the main portion 26; however, this exact configuration is provided by way of example and not limitation. Other hook or loop configurations are contemplated. The loops 34, 36 each have a securing member 38 extending from the loop in a substantially perpendicular direction. The loops 34, 36 of the spring flex toward and away from their respective surface 30, 32 to change the overall length of the first member 16, adjusting to fit a diameter of a variety of bodies with which the flexible locating device 10 can be used. The loops 34, 36 are expanded or contracted to fit the securing members 38, shown here as pegs, into corresponding apertures 40 located on the perimeter 12 of the body. With the pegs 38 secured in the corresponding apertures 40, the first member 16 is securely positioned with respect to the body 14. The pegs are provided by way of example and not limitation and other suitable securing members can be used by those skilled in the art.

The spring and loops 34, 36 are designed to compensate for various aperture locations and various body shapes and sizes. The spring maintains the first member 16 centered within the body 14 by maintaining pressure on the apertures 40. This pressure also allows the body to be positioned vertically without the first member 16 repositioning or falling out of the body 14. The spring and loops 34, 36 shown in FIG. 1 are provided as adjustable components by way of example and not limitation. Other adjustable components can include alternative spring configurations contemplated by those skilled in the art. The at least one spring can be made of a material that is resilient and/or flexible, such as plastic or metal. The loops of the spring can have one or more bends, and can be planar, coiled, or multi-planar as shown, for example. The spring will typically regain its original shape after being compressed or extended, but it is contemplated that the spring may be moved to the required position and remain in that position until moved again, depending on the material of construction. The spring and loops can be integral with the first member 16, as in FIG. 1, or can be a separate piece in cooperation with the first member 16.

Figure 3:
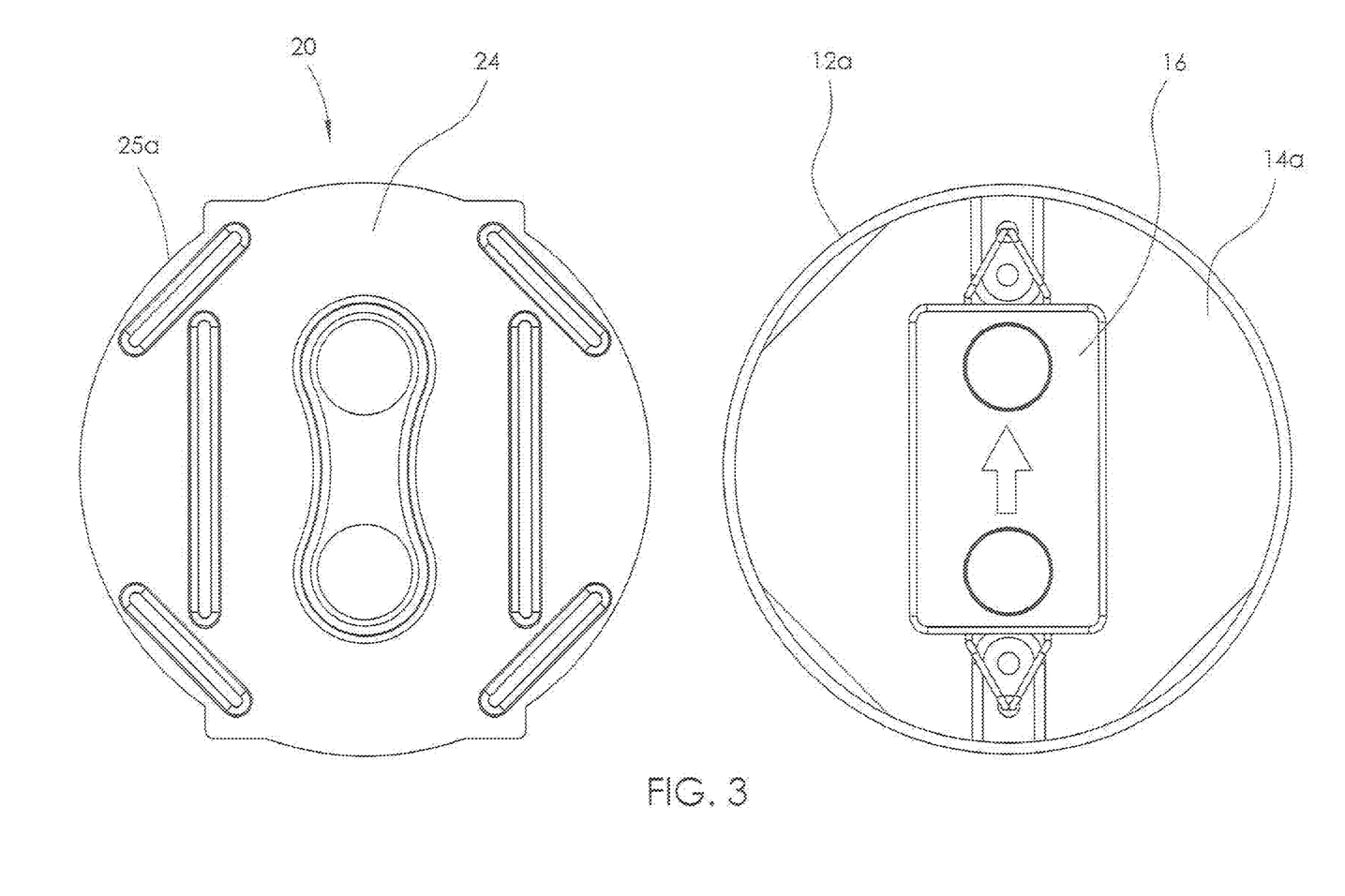
FIG. 3 is an enlarged view of an embodiment of a flexible locating device in a body.
Figure 4:
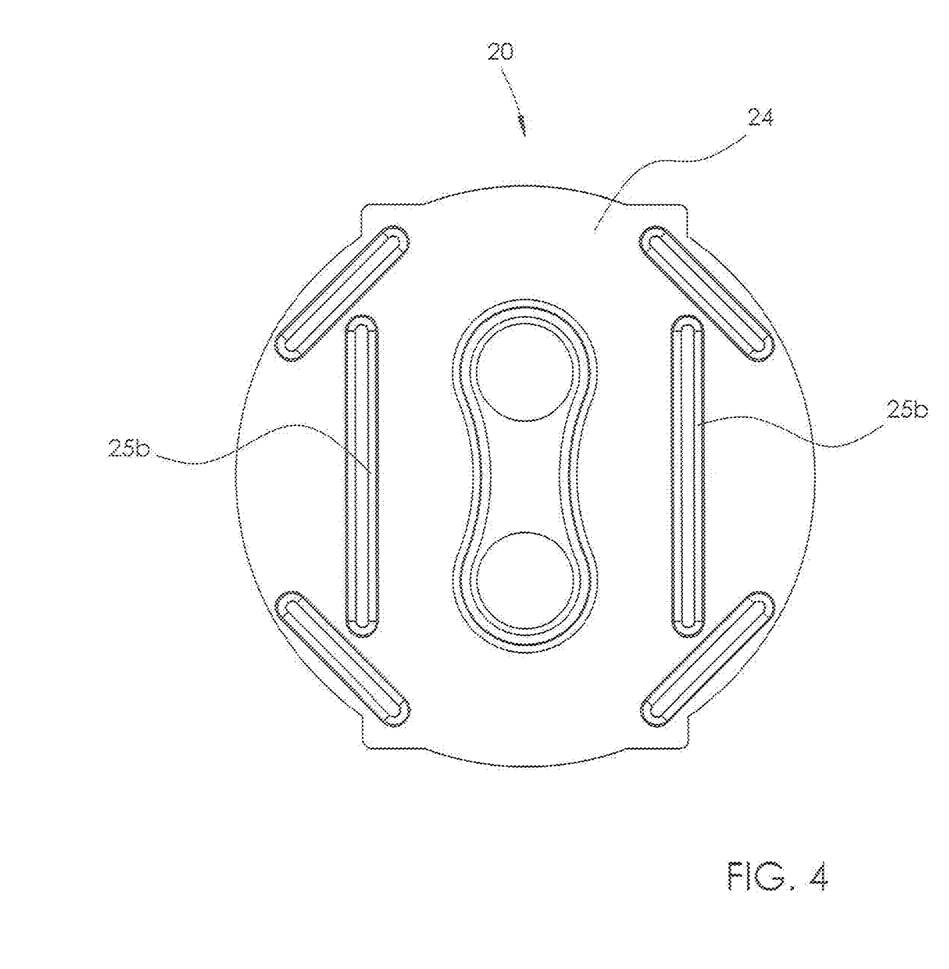
FIG. 4 is an enlarged view of an embodiment of a flexible locating device in another body.
Figure 5:
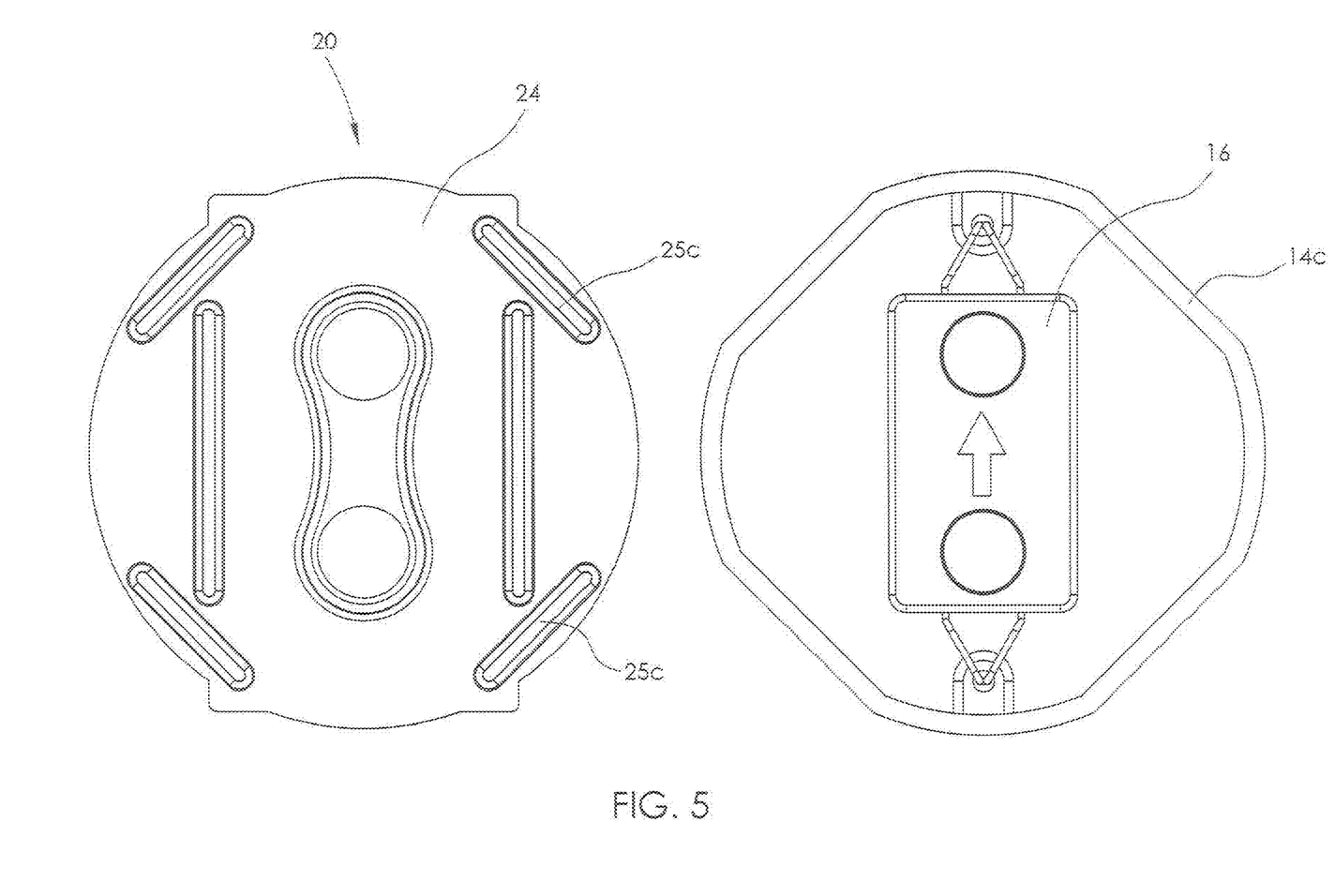
FIG. 5 is an enlarged view of an embodiment of a flexible locating device in yet another body.

As seen in FIG. 1, the second member 20 includes the perimeter defining member 24, which in turn comprises templates 25 for defining each of the various perimeters of bodies that can be used with respect to the outer surface of the sheet 15 of material. The perimeter defining member 24 is configured with different templates 25 to allow for the definition of various shapes and sizes of body perimeters 12. FIGS. 3-5, described below, illustrate examples of the various bodies that can be used and how the perimeter defining member 24 provides the means for defining the bodies' perimeters. FIGS. 3-5 illustrate typical shapes that are currently used. This is not an inclusive list of examples. Other shapes and sizes are contemplated.

Figure 2:
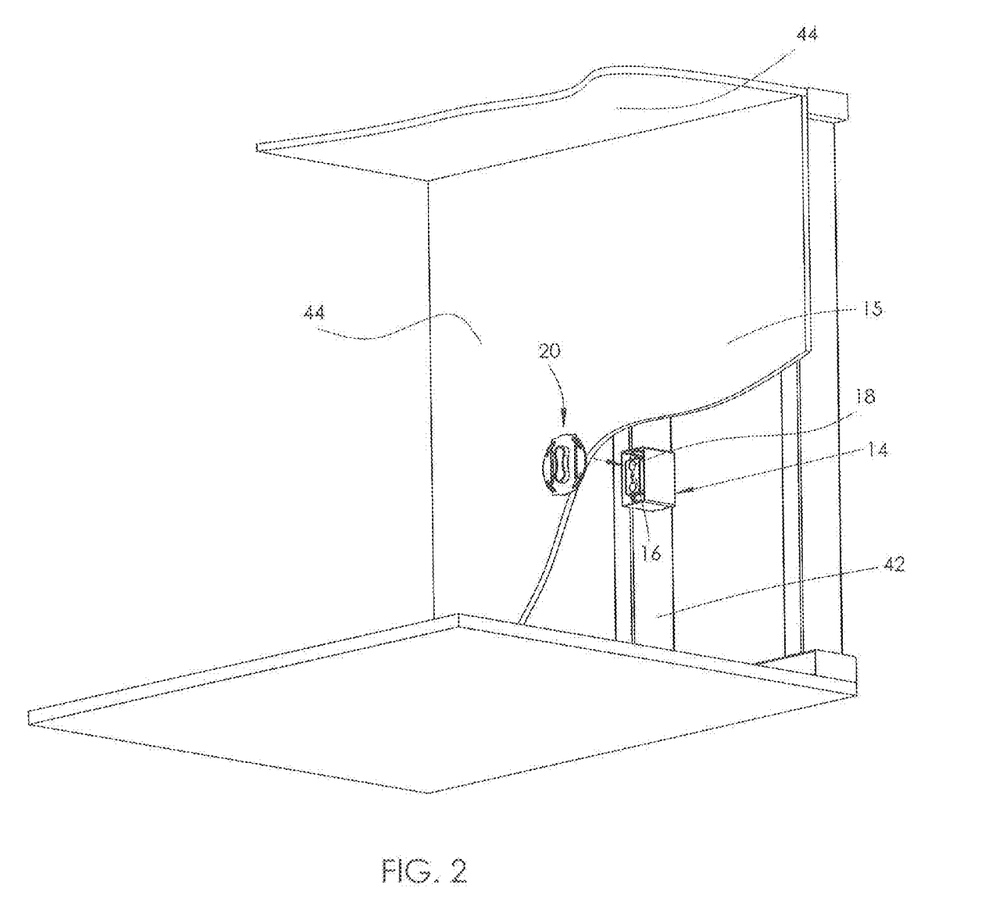
FIG. 2 is a partial cross-section isometric view of an embodiment of a flexible locating device in operation in a structure.

Referring now to FIG. 2, the body 14 is positioned such that it is stationary or immovably associated with a structural member 42. The body 14 is positioned behind a sheet 15 of material. The sheet 15 defines, for example, a wall, ceiling or floor and can be formed from drywall, paneling, plywood, laminate and other typical building materials.

The second member 20 is positionable on an outer surface 44 of the sheet 15 so that it is opposite the body 14, and the at least one magnet 18 of the first member 16 can cooperate with the at least one magnet 22 of the second member 20 to substantially align the perimeter defining member 24 with the perimeter 12 of the body 14. The magnets cooperate in that one of the magnets exposes toward the sheet 15 a "north" pole, or a positive polarity, and the other of the magnets exposes toward the sheet 15 a "south" pole, or a negative polarity. The magnets can cooperate such that the second member 20 can be suspended on the sheet 15 by the magnetic attraction between the magnets. For example, if the magnet 18 of the first member 16 is not cooperating with the magnet of the second member 20, the second member 20 will slide or fall to the ground. When the magnets of the first member 16 and the second member 20 are cooperating, the magnetic attraction between the magnets will substantially align the proper templates 25 of the perimeter defining member 24 with the perimeter 12 of the body 14.

In operation, the perimeter defining member 24 can define the perimeter 12 of the body 14 with respect to the outer surface 44 of the sheet 15 before the sheet 15 is pierced by a piercing or cutting tool. The first member 16 can be positioned internal of the body 14. The sheet 15 can be positioned and mounted with respect to structural members such as structural member 42 and conceal or hide the body 14. The second member 20 can be moved along the surface 44 of the sheet 15 until the magnetic attraction between the magnet 18 of the first member 16 and the magnet (not shown) of the second member 20 becomes apparent and the second member 20 can be left suspended with respect to the sheet 15. A marking instrument can be used to trace the perimeter defining member 24 in the template 25 that corresponds to the type or shape of body 14 used. The perimeter defining member 24 and its various templates 25 are described in more detail with reference to FIGS. 3-5. The second member 20 can be removed from the sheet 15 and the sheet 15 can be cut or pierced to expose the body 14.

In the case where more than one first member 16 is used due to the size of the body 12, these steps can be repeated for each of the first members positioned internal of the body 12. The perimeter 14 of the body 12 can be defined by the outline or outermost markings of the several tracings.

FIGS. 3-5 illustrate examples of the various bodies that can be used and how the perimeter defining member 24 provides templates 25 for the various bodies' perimeter definitions. FIGS. 3-5 illustrate typical shapes that are currently used. This is not an inclusive list of examples. Other shapes and sizes are contemplated. As a non-limiting example, a body that incorporates the size of three single rectangular bodies can be used. In such a case, more than one first member 16 may be required to completely define the perimeter.

The second member 20 with the perimeter defining member 24 is depicted in FIG. 3 next to a commonly found circular body 14a. The circular body 14a is illustrated with the first member 16 in its internal position, using the adjustable portion, shown as springs with pegs, to secure the first member 16 within the body 14a. This is the position in which the body 14a and first member 16 would be as the body 14a is secured to a structural member as described above. When the magnets of the second member 20 have aligned with the magnets of the first member 16 as described above, the perimeter 12a of the body 14a is defined by the perimeter defining member 24. Because the body 12a is circular, the particular template 25a used to define the perimeter 12a is the outer perimeter of the second member 20. The marking instrument can be used to trace the template 25a to define the substantially circular shape of the body 14a used in this embodiment.

The second member 20 with the perimeter defining member 24 is depicted in FIG. 4 next to a commonly found rectangular body 14b. The rectangular body 14b is illustrated with the same first member 16 used in FIGS. 1-3. The position shown is that in which the body 14b and first member 16 would be as the body 14b is secured to a structural member as described above. When the magnets of the second member 20 have aligned with the magnets of the first member 16 as described above, the perimeter 12b of the body 14b is defined by the perimeter defining member 24. Because the body 12b is rectangular, the particular template 25b used to define the perimeter 12b is the vertical parallel spaced lines defining two of the outer edges of the body 14b. The marking instrument can be used to trace the template 25b to define the rectangular shape of the body 14a used in this embodiment.

The second member 20 with the perimeter defining member 24 is depicted in FIG. 5 next to a commonly found body 14c that is substantially square or octahedral. This body 14c is also illustrated with the same versatile first member 16 in its internal position. This is the position in which the body 14c and first member 16 would be as the body 14c is secured to a structural member as described above. When the magnets of the second member 20 have aligned with the magnets of the first member 16 as described above, the perimeter 12c of the body 14c is defined by the perimeter defining member 24. Because the body 14c is substantially square or octahedral, the particular template 25c used to define the perimeter 12c corresponds to four sides of the octahedral shape, or the four cut off corners of the substantially square shape of the body 14c. The marking instrument can be used to trace the template 25c to define the substantially circular shape of the body 14c used in this embodiment.

The overall shape of the second member 20 shown in FIGS. 1-5 is a substantially circular shape. The shape is provided by means of example and not meant to be limiting. Any suitable shape that can support the perimeter defining member 24 can be used. The second member 20 can be a single molded piece, or can be formed from more than one piece. The materials of construction can be, as non-limiting examples, plastic, wood, or resin. The depth of the second member 20 can be any depth sufficient enough to support the at least one magnet. The depth can vary across the width of the second member 20. For example, at least a portion of the second member 20 may be of sufficient depth to support the magnets. At least a portion of the second member 20 may be fairly thin, yet substantial enough to hold its shape and the perimeter defining member 24. The perimeter defining member 24 can comprise as many templates 25 as desired or required.

The first and second members 16, 20 can include textual information. For example, as shown in FIG. 1, the second member 20 can display the target markings 52 on the at least one magnet area. Another example would be to include the term "UP" to assist a user in aligning the first and second members 16, 20. The textual information can be formed integral with the members 16, 20, for example, stamped or molded with respect to the members 16, 20. Alternatively, the textual information can be engaged with the members 16, 20, such as with an adhesive label.

Figure 6:
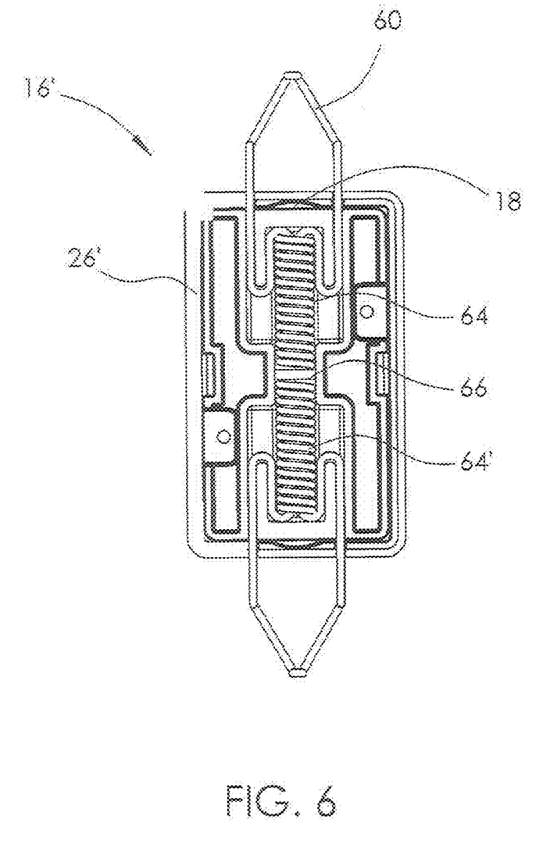
FIG. 6 is a perspective view of one side of another embodiment of a flexible locating device disclosed herein
Figure 7:
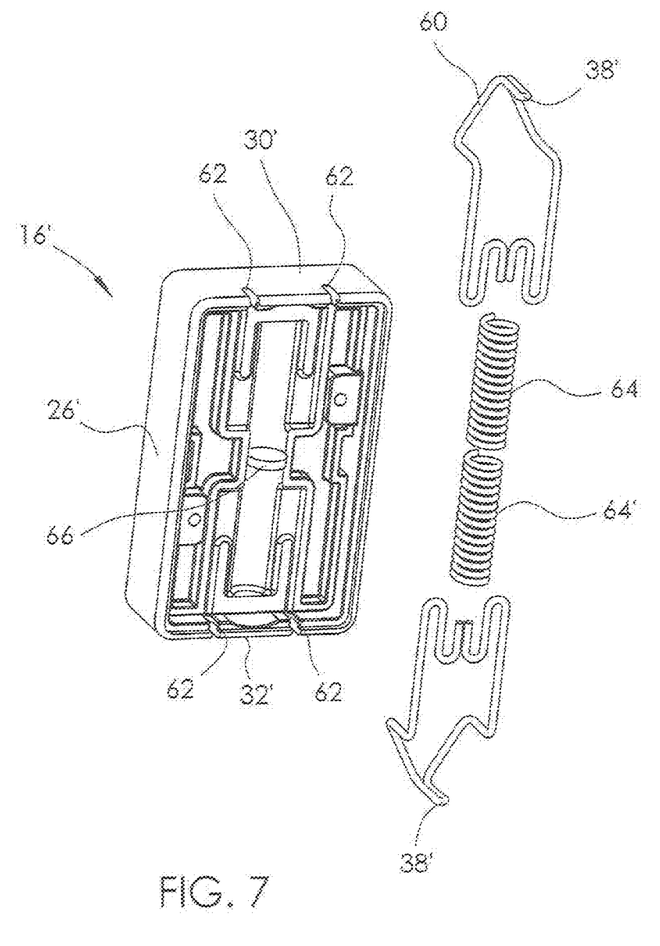
FIG. 7 is an exploded isometric view of FIG. 6.
Figure 8:
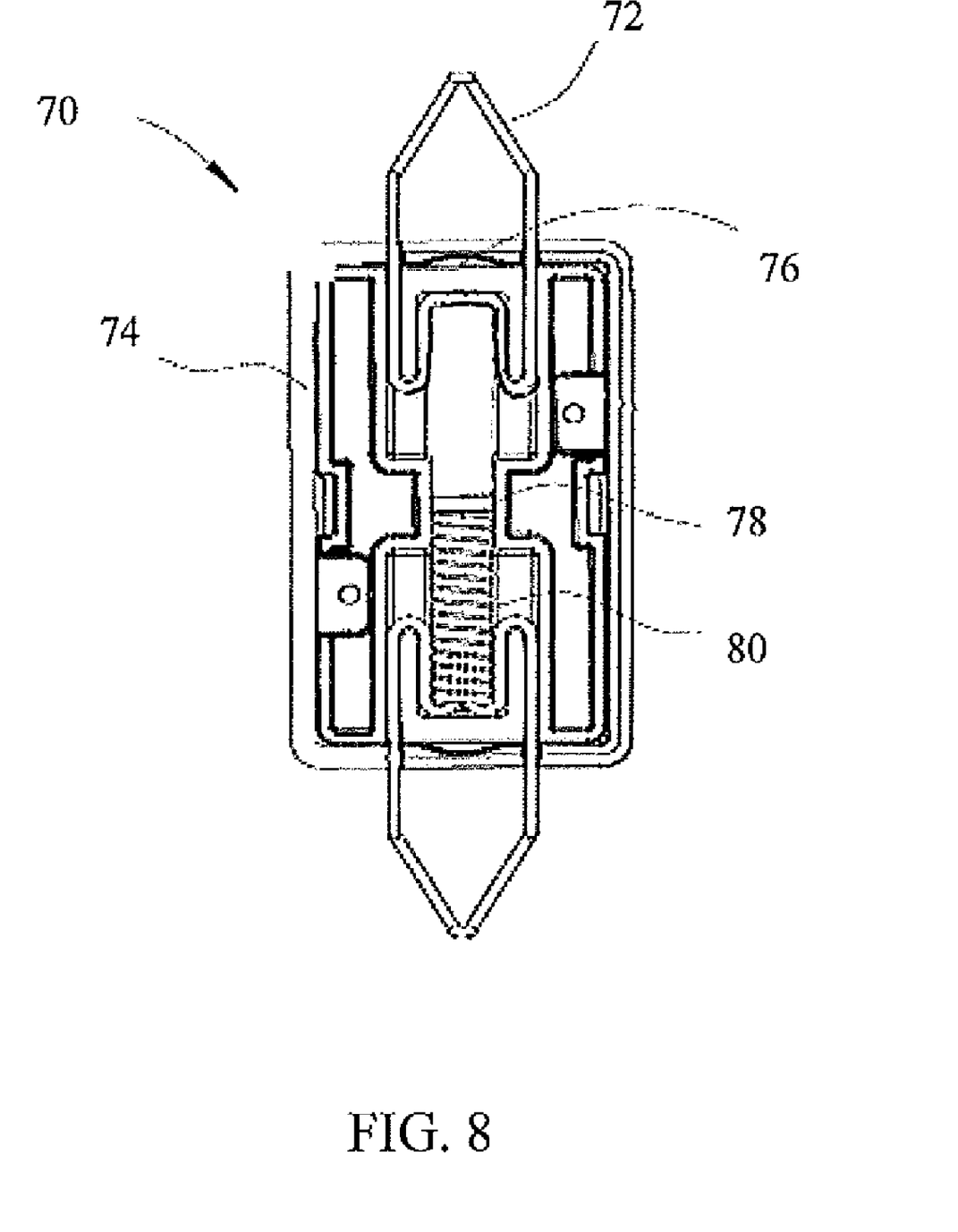
FIG. 8 is a perspective view of one side of another embodiment of a flexible locating device.

FIGS. 6 and 7 illustrate an alternative embodiment of the first member 16 of the flexible locator device 10. FIG. 6 illustrates the first member 16', while FIG. 7 is an exploded view of the main component or portion 26' in relation to an adjustable component 60. In this embodiment, the adjustable component 60 of the first member 16' is a separate component from the main portion 26', rather than molded with or integral to the main portion. The main portion 26' is substantially similar to the main portion 26 described above, and can be a single molded piece or more than one piece configured to hold the at least one magnet 18. In this embodiment, an interior edge on each of the top surface 30' and bottom surface 32' has a recess 62 formed to cooperate with a portion of the adjustable component 60 such that at least a portion of the adjustable component 60 is securely positioned within the main portion 26' of the first member 16'. The spring 64, not seen in the previous embodiment, is shown in this embodiment to be two separate springs 64, 64'. The springs 64, 64' tension against a plate 66 integral with the main portion 26'. The securing members, or pegs, 38' can be seen clearly in FIG. 7. This embodiment of the first member 16' of the flexible locating device is used in conjunction with the second member 20 as described above, and can be used in the variety of body shapes and sized disclosed herein.

The adjustable components disclosed herein are provided by way of example and are not meant to be limiting. Other spring and/or loop configurations are contemplated. For example, the spring may be a planar zig zag component that has bends that move the ends of the component away from and toward the main portion 26.

Also disclosed herein is a perimeter defining device for use with a first member, wherein the first member has means for securing itself in a body. The perimeter defining device is the second member 20 described herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included with the spirit and scope of the appended claims, which scope is to be accorded the broadcast interpretation so as to encompass all such modifications and equivalent structures as is permitted under the law.

What is claimed is:

1. An apparatus capable of locating a perimeter of a body with respect to an outer surface of a sheet of material, wherein the body is stationary behind the sheet of material, and wherein the body can be one of a multitude of body shapes, the apparatus comprising:
    a target member comprising:
        a main portion with a top surface and a bottom surface;
        an adjustable component extending from at least one of the top surface and the bottom surface of the main portion and having a securing member, wherein the adjustable component is separate from the main portion and the main portion comprises recesses, wherein the recesses are sized and positioned to receive and secure the adjustable component to the main portion; and
        at least one magnet attached to the main portion; and
    a defining member positionable on an outer surface of the sheet of material opposite the body, the defining member comprising:
        at least one opposing magnet with an opposite polarity of the at least one magnet of the target member; and
        a perimeter defining member comprised of more than one template, each template configured to define a perimeter of one of the multitude of body shapes.

2. The apparatus of claim 1, wherein the adjustable component extends from one of the top surface and the bottom surface, while the other of the top surface or bottom surface is fixed and includes a securing member, wherein the securing members secure the target member in the body.

3. The apparatus of claim 1, wherein the adjustable component extends from both of the top surface and the bottom surface, wherein the securing members are positioned on ends of the adjustable component opposite the top surface and bottom surface and secure the target member in the body.

4. The apparatus of claim 1, wherein the target member is of a shape and a size that fits the multitude of body shapes.

5. The apparatus of claim 1, wherein a magnetic attraction between the magnets of the target member and the defining member will substantially align the template of the perimeter defining member with the perimeter of the body.

6. The apparatus of claim 1, wherein a magnetic attraction between the magnets of the target member and the defining member will hold the defining member substantially stationary without support when the magnets are aligned.

7. The apparatus of claim 1, wherein the defining member further comprises a raised portion configured for gripping and positioning the defining member.

8. The apparatus of claim 1, wherein the perimeter defining member is a perimeter defining device used with the at least one magnet attached to the main portion, wherein the at least one magnet attached to the main portion has means for maintaining itself in the body positioned behind the sheet of material, wherein the body can be one of a multitude of body shapes, and wherein a magnetic attraction between the magnets of the perimeter defining device and the at least one magnet attached to the main portion will substantially align a template on the perimeter defining device with the perimeter of the body and further wherein the target member is of a shape and a size that fits the multitude of body shapes.

9. An apparatus capable of locating a perimeter of a body with respect to an outer surface of a sheet of material, wherein the body is stationary behind the sheet of material, and wherein the body can be one of a multitude of body shapes, the apparatus comprising:
    a target member comprising
        a main portion with a top surface and a bottom surface;
        an adjustable component extending from at least one of the top surface and the bottom surface of the main portion and having a securing member, wherein the adjustable component is formed integral with the main portion of the target member; and
        at least one magnet attached to the main portion; and
    a defining member positionable on an outer surface of the sheet of material opposite the body, the defining member comprising:
        at least one opposing magnet with an opposite polarity of the at least one magnet of the target member; and
        a perimeter defining member comprised of more than one template, each template configured to define a perimeter of one of the multitude of body shapes.

10. A method of defining a body rigidly positioned behind a sheet of material, wherein the body can be one of a multitude of body shapes, the method comprising:
    securing a target member in the body, wherein the target member comprises a main portion with a top surface and a bottom surface, an adjustable component extending from at least one of the top surface and the bottom surface of the main portion and having a securing member and at least one magnet attached to the main portion, wherein the adjustable component is separate from the main portion and the main portion comprises recesses, wherein the recesses are sized and positioned to receive and secure the adjustable component to the main portion;
    positioning the sheet of material over the body and target member;
    positioning a defining member on an outer surface of the sheet of material opposite the body, the defining member comprising at least one opposing magnet with an opposite polarity of the at least one magnet of the target member and a perimeter defining member comprised of more than one template, each template configured to define a perimeter of one of the multitude of body shapes; and
    defining the perimeter of the body on the sheet of material with the cooperating template.

11. The method of claim 10 further comprising:
    removing the sheet of material within the defined perimeter; and
    removing the target member from within the body.

12. The method of claim 10, wherein securing the target member comprises adjusting a dimension of the target member with the adjustable component to a dimension of the body and securing the securing member of the adjustable component within a corresponding aperture within the body.

13. The method of claim 10, wherein positioning the defining member comprises aligning the at least one magnet of the defining member with the at least one magnet of the target member.

14. The method of claim 13, wherein a magnetic attraction between the magnets of the target member and the defining member will substantially position the template of the perimeter defining member with the perimeter of the body.

15. The method of claim 13, wherein a magnetic attraction between the magnets of the target member and the defining member will hold the defining member substantially stationary without support when the magnets are aligned.

16. The method of claim 10, wherein the adjustable component extends from both of the top surface and the bottom surface, wherein the securing members are positioned on ends of the adjustable component opposite the top surface and bottom surface and secure the target member in the body.

17. The method of claim 10, wherein the target member is of a shape and a size that fits the multitude of body shapes.

18. A method of defining a body rigidly positioned behind a sheet of material, wherein the body can be one of a multitude of body shapes, the method comprising:

securing a target member in the body, wherein the target member comprises a main portion with a top surface and a bottom surface, an adjustable component extending from at least one of the top surface and the bottom surface of the main portion and having a securing member and at least one magnet attached to the main portion, wherein the adjustable component is formed integral with the main portion of the target member;

positioning the sheet of material over the body and target member;

positioning a defining member on an outer surface of the sheet of material opposite the body, the defining member comprising at least one opposing magnet with an opposite polarity of the at least one magnet of the target member and a perimeter defining member comprised of more than one template, each template configured to define a perimeter of one of the multitude of body shapes; and     defining the perimeter of the body on the sheet of material with the cooperating template.

\* \* \* \* \*